US010679376B2

(12) United States Patent
Balan et al.

(10) Patent No.: US 10,679,376 B2
(45) Date of Patent: Jun. 9, 2020

(54) DETERMINING A POSE OF A HANDHELD OBJECT (71) Applicant: Microsoft Technology Licensing, LLC, Redmond, WA (US)

(72) Inventors: Alexandru Octavian Balan, Sammamish, WA (US); Ronald Boskovic, Issaquah, WA (US); Filip Panjevic, Belgrade (RS); Ivan Razumenic, Belgrade (RS); Vuk Jovanovic, Belgrade (RS)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 72 days.

(21) Appl. No.: 15/961,539

(22) Filed: Apr. 24, 2018

(65) Prior Publication Data

US 2019/0325600 A1 Oct. 24, 2019

(51) Int. Cl.
*G06T 7/70* (2017.01)
*G06T 19/00* (2011.01)
*G06F 3/01* (2006.01)
*G02B 27/01* (2006.01)
*G06T 7/60* (2017.01)

(52) U.S. Cl.
CPC ............ *G06T 7/70* (2017.01); *G02B 27/0172* (2013.01); *G06F 3/011* (2013.01); *G06T 7/60* (2013.01); *G06T 19/006* (2013.01); *G02B 2027/0138* (2013.01)

(58) Field of Classification Search
None
See application file for complete search history.

(56) References Cited

U.S. PATENT DOCUMENTS

2003/0035098 A1* 2/2003 Ishiyama ........... G06K 9/00234
356/72
2013/0335529 A1* 12/2013 Engedal ............... H04N 13/204
348/46
2017/0330387 A1* 11/2017 Dearman ................ G06F 3/011

OTHER PUBLICATIONS

Hao et al. "Efficient 2D-to-3D Correspondence Filtering for Scalable 3D Object Recognition", 2013 IEEE Conference on Computer Vision and Pattern Recognition (Year: 2013).*

* cited by examiner

*Primary Examiner* — Saptarshi Mazumder
(74) *Attorney, Agent, or Firm* — Alleman Hall Creasman & Tuttle LLP (57) ABSTRACT Examples are disclosed herein that relate to determining a pose of a handheld object. One example provides a computing system configured to determine a pose of a handheld object comprising a plurality of light sources by acquiring image data of a surrounding environment, detecting a subset of light sources of the plurality of light sources of the handheld object in the image data, and performing a search, without using previous pose data, to determine the pose of the handheld object relative to the computing system. The computing system is further configured to use the pose determined to perform a later search for an updated pose of the handheld object, and if the later search fails to find the updated pose, determine the updated pose by again performing the search without using previous pose data.

20 Claims, 10 Drawing Sheets

DETERMINING A POSE OF A HANDHELD OBJECT

BACKGROUND

Motion may be tracked as computing device input via data from various sensors, such as image sensors and inertial sensors.

SUMMARY

Examples are disclosed herein that relate to determining a pose of a handheld object. Examples are disclosed herein that relate to determining a pose of a handheld object. One example provides a computing system configured to determine a pose of a handheld object comprising a plurality of light sources by acquiring image data of a surrounding environment, detecting a subset of light sources of the plurality of light sources of the handheld object in the image data, and performing a search, without using previous pose data, to determine the pose of the handheld object relative to the computing system. The computing system is further configured to use the pose determined to perform a later search for an updated pose of the handheld object, and if the later search fails to find the updated pose, determine the updated pose by again performing the search without using previous pose data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A computing system may comprise a head-mounted display device (HMD) that interfaces with one or more handheld controllers and/or other handheld peripheral objects. To make an HMD-based augmented reality, mixed reality, or virtual reality experience more immersive, the poses of the HMD and a handheld controller may be tracked as the devices are moved through space by a user, and the poses may be used as inputs to control the HMD.

In such a scenario, a handheld controller may have a plurality of light sources distributed over its surface to assist in optical tracking of a pose of the handheld controller, e.g. via one or more cameras on the HMD. However, performing optical tracking of light sources on the handheld controller may be computationally expensive.

Figure 1:
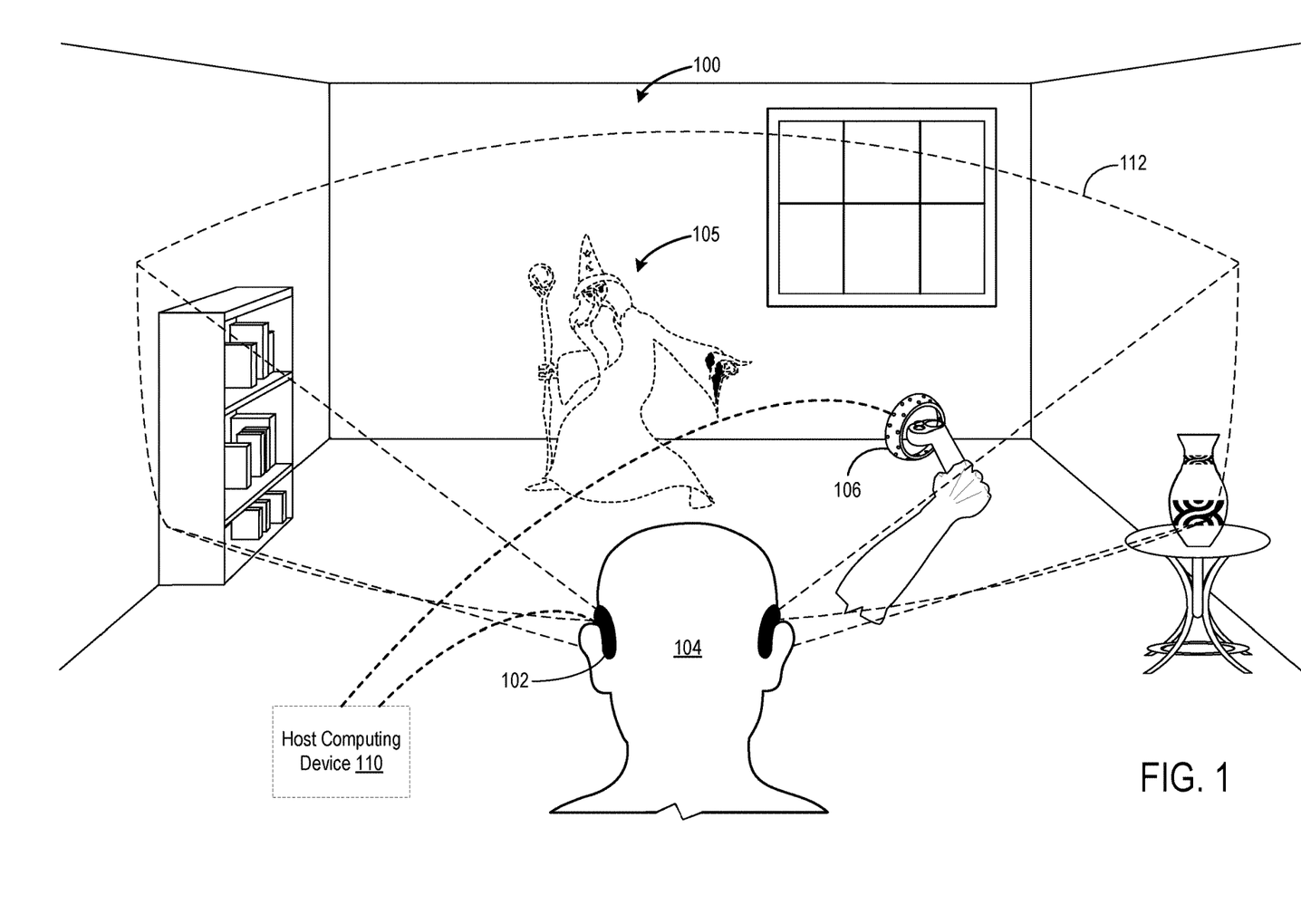
FIG. 1 shows an example use scenario in which poses of a wearable device and handheld object are tracked as computing device input.
Figure 2:
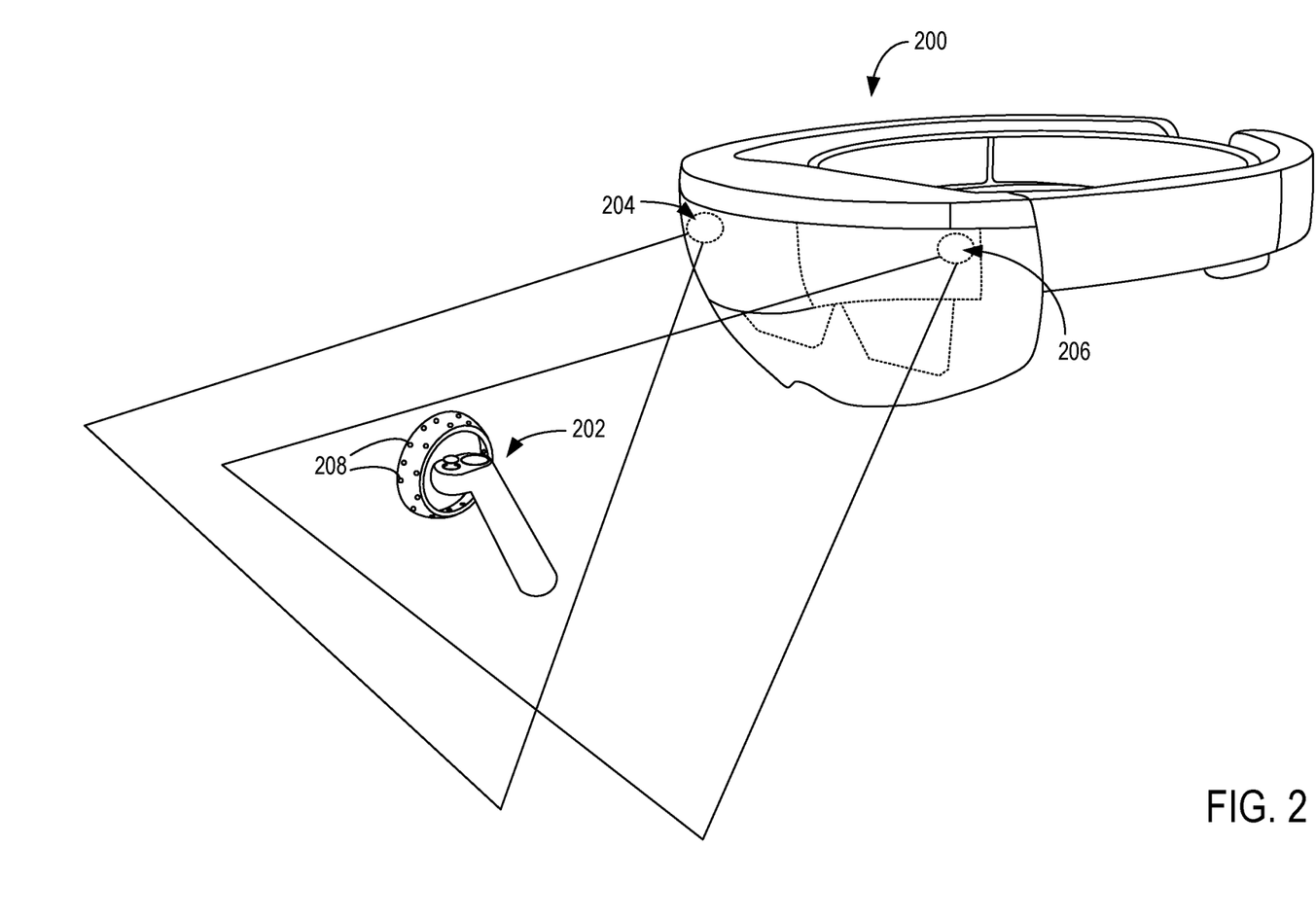
FIG. 2 shows an example wearable device imaging a handheld object.

Accordingly, examples are disclosed herein that relate to efficiently determining a pose of a handheld controller. Prior to discussing these examples, FIG. 1 shows an example scenario 100 in which a HMD 102, worn by a user 104, displays virtual and/or augmented reality imagery 105. One or more outward-facing cameras on the HMD 102 may acquire image data (e.g. visible light image data) of the surrounding environment and of a handheld object 106 held by the user 102. For example, FIG. 2 shows an example HMD 200 imaging a handheld object 202 using a stereo camera imaging system (indicated by first camera 204 and second camera 206). The term "handheld object" is used herein to represent an object comprising trackable light sources 208 that may be handheld, whether or not the object is currently in the state of being held in a hand.

The handheld object 106 may, in some examples, include an onboard processor, storage system, and communication system. In other examples, the handheld object may not include one or more such systems, but still may include lights to assist in optical tracking of the handheld object. The handheld object 106 may also include one or more input controls, such as a button, trigger, joystick, directional pad, touch screen, etc. The handheld object 106 further comprises an inertial measurement unit (IMU) (which may include an accelerometer, gyroscope, magnetometer, and/or other suitable sensors) that provides output related to changes in position and orientation of the handheld object 106. In some examples, the HMD 102 may also include an IMU to help track changes in the HMD pose in the environment.

The depicted handheld object 200 has a plurality of light sources 208 distributed along both an exterior and interior of a ring-like structure of the handheld controller 200. The light sources are configured to form patterns of light ("constellations") in image data acquired by the camera or cameras of the HMD, such that a pose of the handheld object may be determined from an image capturing the controller. The light sources may take any suitable form, such as light-emitting diodes (LEDs) that emit visible light for detection via a visible light camera or cameras on the HMD. Infrared light sources also may be used. In some examples, the camera(s) on the HMD may be configured to filter wavelengths of light other than those emitted by the LEDs to reduce noise levels in the image data. A handheld object may have any suitable number and arrangement of light sources. In one example, a handheld object may have an arrangement of thirty-two visible light LEDs that may be actively illuminated for device tracking.

In some examples, the HMD 102 and handheld object 106 are configured to communicate with one another directly, such as via a wireless network connecting utilizing a Bluetooth communication protocol or other suitable wireless communication protocol. In other examples, an optional host computing device 110 may communicate with the HMD 102 and the handheld object 106 to receive data from HMD 102 and handheld object 106 (including image data acquired by the HMD 102 and IMU data from the handheld object 106), to process such data, and to send control signals to these devices.

A relative-to-HMD pose (position and orientation) of the handheld object 106 may be estimated by tracking the positions of light from the light sources on the handheld object 106 using the one or more cameras on the HMD 102. Data from the IMU on the handheld object 106 can further inform tracking, such as when the light sources might be occluded from view.

Figure 3:
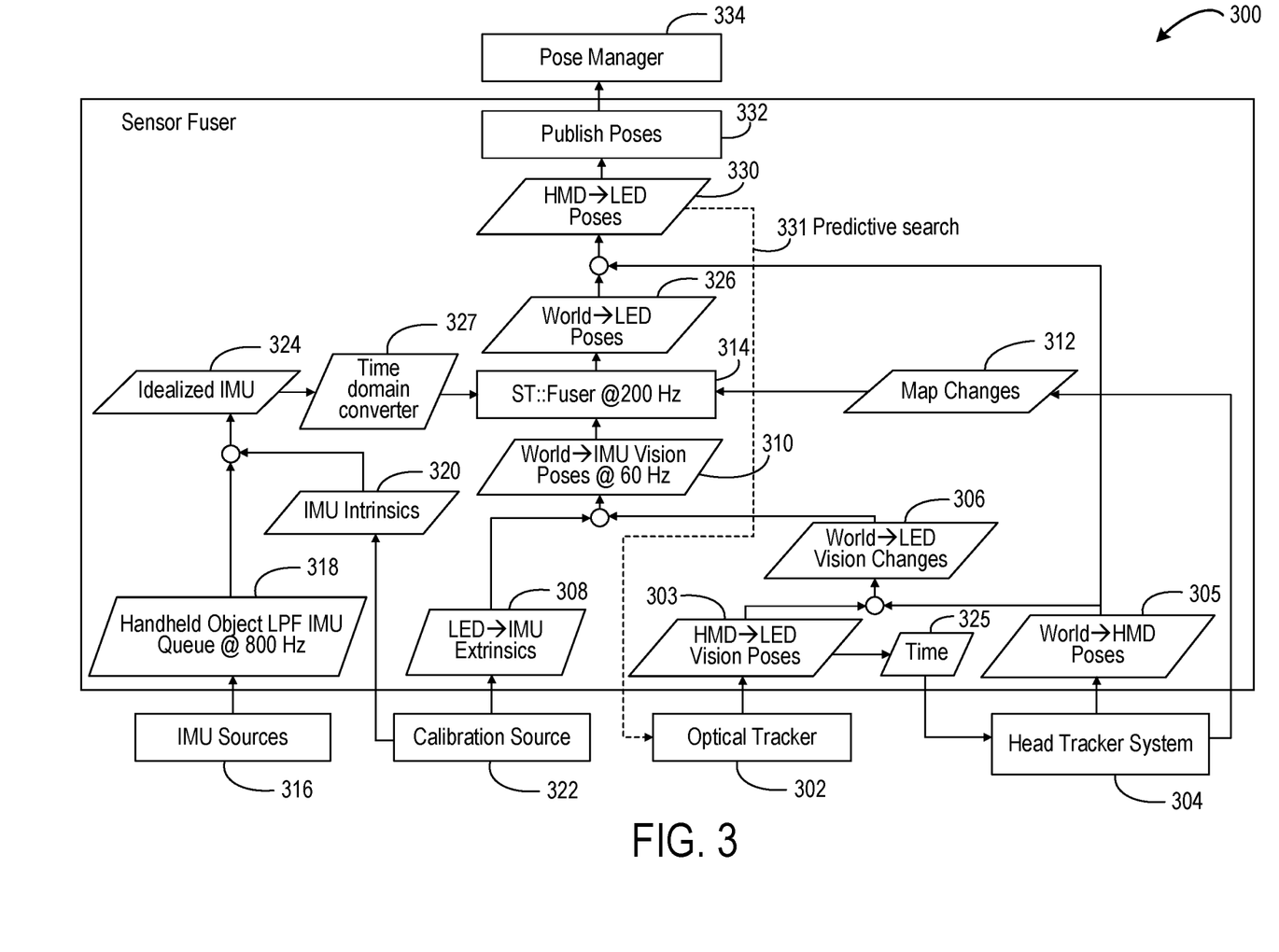
FIG. 3 shows an example processing system operable to derive the pose of a handheld object and HMD with respect to real world coordinates.

The image data provides a pose of the handheld object 106 relative to the HMD 102, while the IMU senses the forces proportional to the change in position and orientation in its body frame relative to the inertial frame. Thus, to combine the optical pose from image data with the IMU data to provide the actual pose of the handheld object 106 relative to the world, processing may be used to "fuse" the IMU data with the optical data by mapping the optical data to world coordinates. FIG. 3 shows a block diagram of an example processing system 300 that may be used to derive the pose of the handheld object and HMD with respect to real world coordinates from IMU data from the handheld object, and image and/or IMU data from the HMD. The processing system 300 may be implemented via any suitable hardware, including but not limited to the HMD, the handheld object, a host computing device in communication with the HMD and/or the handheld object, or distributed among multiple of these devices and/or other devices.

In the depicted system 300, the HMD receives image data capturing the surrounding environment and the handheld object(s) in the scene via an image sensor located on the HMD. Image data used to track the surrounding environment is referred to herein as "environmental tracking exposures" and image data used to track handheld object(s) is referred to herein as "handheld object tracking exposures."

An optical tracker 302 of the HMD analyzes the image data and outputs data regarding the pose of the handheld object (or each handheld object, where multiple handheld objects are detected) with respect to the HMD ("HMD→LED Vision Poses" 303) by visually tracking the position and orientation of the handheld object per frame using the handheld object tracking exposures. Light sources may be identified in the image data, for example, by thresholding the image to find rough light source locations, and then fitting a statistical curve (e.g. a Gaussian function) to the thresholded images to locate the light source on a pixel or sub-pixel basis. Once the light sources in the image data are located, an optical pose of the handheld object relative to the HMD may be determined, as described in more detail below.

A head tracker system 304 provides a pose of the HMD relative to the world ("World→HMD Poses" at 305) by visually tracking the HMD relative to the background environment using the environmental tracking exposures. Any suitable method may be used to perform the environmental feature tracking. For example, environmental features may be tracked by performing image recognition on the environmental tracking exposures, e.g. to identify features such as edges in the image and then track changes in location of the features between environmental exposure frames.

The optical pose of the handheld object with respect to the HMD ("HMD→LED Vision Poses" at 303) and the optical pose of the HMD relative to the world ("World→HMD Poses" at 305) are used to determine a pose of the handheld object with respect to the world. The pose thus determined is also referred to herein as a "visual pose." This pose may be provided in the form of data representing changes in pose compared to a previous determination, as indicated at 306 ("World→LED Vision Changes"), or in any other suitable form. This data is adjusted via extrinsic calibration data (illustrated as "LED→IMU Extrinsics" at 308) regarding the light sources and IMU of the handheld object to produce "World→IMU Vision Poses" at 310.

Optical pose data regarding the pose of the handheld object ("HMD→LED Vision Poses" at 303) and the pose of the HMD ("World→HMD Poses" at 305), both visually observed from the perspective of the HMD, are further provided to a fuser 314. The fuser 314 takes the optical pose data and "fuses" it with IMU data received the handheld object to provide an actual pose of the handheld object with respect to the environment.

IMU data is received from IMU sources 316 on the handheld object. The IMU data may represent six degrees of freedom. Because accelerometers and gyroscopes may have random errors which have a flat frequency response that spans the whole bandwidth, a low pass filter (LPF) at 318 may be used to reduce such noise by removing the high frequency components while keeping low frequency components that may be more indicative of gross movement. Filtering may be performed remotely (e.g. via a host PC) or locally, and the data also may be downsampled. The resulting IMU data then may be adjusted via intrinsic calibration data 320 (illustrated as calibration source 322) previously stored for the handheld object. Example intrinsic calibration data 320 includes data regarding stereo camera offset and relative camera positions. Such calibration data may be updated during system use, as described in more detail below. The resulting "Idealized IMU" data 324 is provided to the fuser 314 for fusing with the image data from the head tracker system and the optical tracker.

The handheld object and the HMD operate in separate clock domains, and communications channels between them may experience lag and potentially inconsistent data rates. As such, to help relate the IMU data to a temporally corresponding visual tracking pose 310, a time domain converter 327 is used to align the time domains of the handheld object with that of the HMD.

Time information 325 regarding when optical poses were measured is provided to the head tracker system 304. The head tracker system 304 may give a most probable World→HMD pose at the time of when a corresponding HMD→LED vision pose is obtained so that the discrete time moments regarding when HMD→LED Vision Poses 303 and World→HMD Poses 305 are evaluated are sufficiently coincident.

As the visual pose data for the handheld object that is input to the fuser is relative to the external environment, and as the IMU data from the handheld object is in its body frame relative to the inertial frame, the fuser 314 may fuse these data and output the handheld object pose with respect to the world, shown as "World→LED Poses" at 326. The fuser 314 may fuse these data in any suitable manner. In some examples, multiple Kalman filters may be used, each operating on discrete data at discrete time stamps, to help accommodate uncertainties with regard to correspondence in timing of the IMU data and the visual pose data.

A "Map Changes" process 312 may be utilized to track changes in head pose with respect to different tracking features within the world, and adjust mapping when the tracking features change (e.g. when a user moves between rooms). "Map Changes" may be performed by rebasing world coordinates on a new world coordinate system, or by mapping the new world coordinates back to the original world coordinate system. Such updates to the map may ensure that ongoing changes in the location of the HMD relative to the world are continually taken into account by the fuser 514.

The "World→HMD Poses" 326 output by the fuser may be used to derive a relation of the HMD to the handheld object, shown as "HMD→LED Poses" 330. "HMD→LED Poses" data 330 may be sent as feedback to the optical tracker 302 for motion prediction purposes to help predict an expected pose of the controller in a next frame based upon HMD motion and the handheld object pose, as indicated by dashed arrow 331 and described in more detail below. The use of motion to help determine current poses may help to more efficiently determine a current pose compared to not using such motion data. Pose data further may be published at 332 and sent to a pose manager 334.

Figure 4:
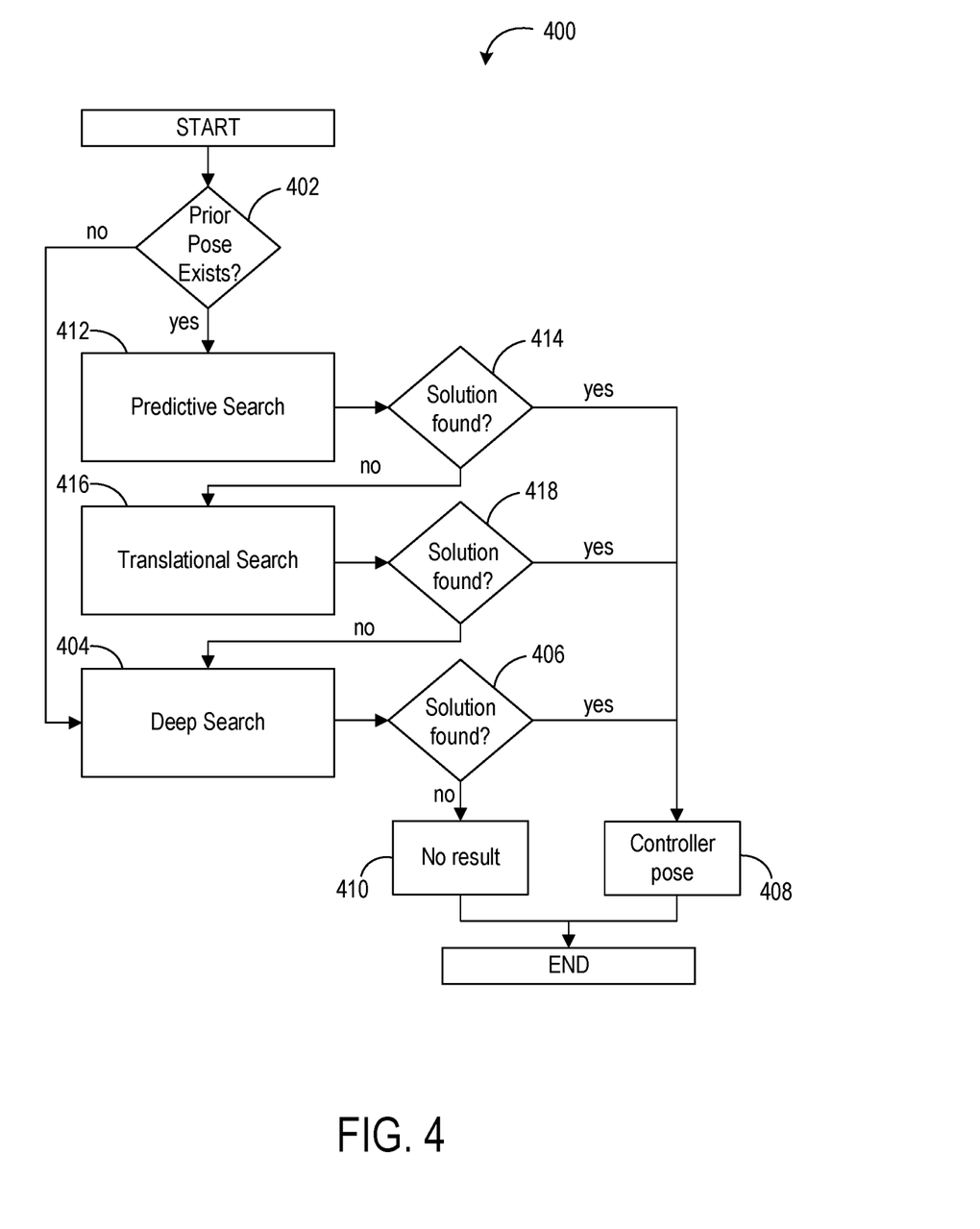
FIG. 4 shows a flow diagram illustrating an example method of determining a pose of a handheld object.

FIG. 4 shows a flow diagram illustrating an example method 400 of determining a pose of a handheld object using image data capturing the handheld object. Method 400 may be performed, for example, by the optical tracker of an HMD, such as optical tracker 302 of FIG. 3, and may be performed separately for each camera of a stereo camera pair. For the purposes of the examples disclosed herein, the pose determination methods are described in the context of pose determination for a single handheld object. In some examples, where light sources of a second handheld object are also captured in the image data, the light sources of the second handheld object may be identified and treated as outliers.

First, method 400 includes determining initially at 402 whether or not a prior pose determination exists. If not, a pose search may be performed without any previous pose data regarding the handheld object. A search that does not use previous pose data is referred to herein referred to as "deep search" 404.

Figure 5A:
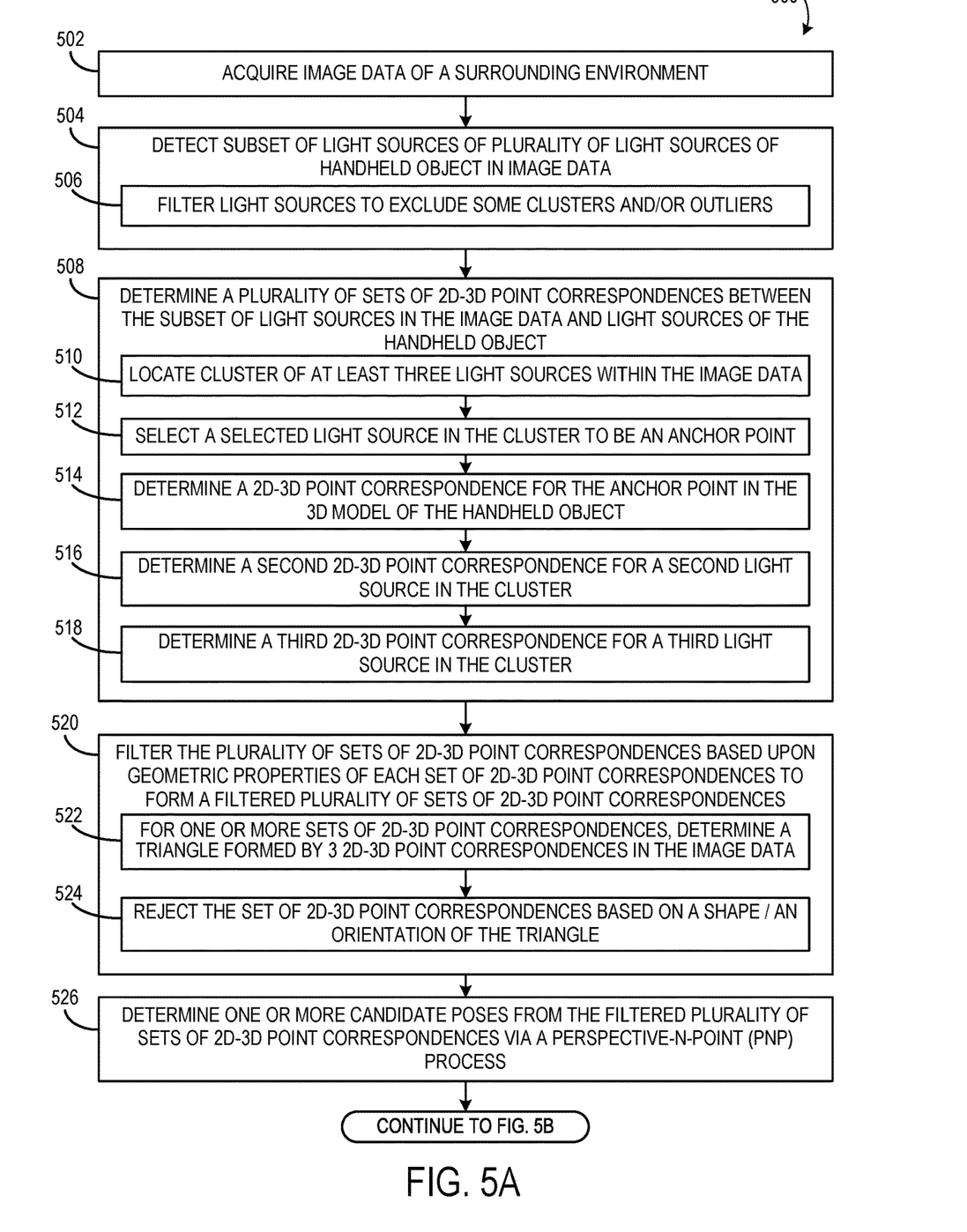
FIGS. 5A-5B show a flow diagram illustrating another example method of determining a pose of a handheld object.

In an example deep search, a Perspective-n-Point (PnP) process, in which points in a three-dimensional model of the handheld object are transformed into corresponding two-dimensional (2D) points in the image frame, is used to determine candidate handheld object poses. More specifically, the PnP process may be used to hypothesize associations between the image observations and the points in the 3D model. A cost function is used to evaluate the candidate poses and determine which associations are the most accurate, thereby obtaining data associations and the most likely pose of the handheld object based on the data associations. Such a deep search method is described in more detail below with regard to FIG. 5.

After performing the deep search, if a solution is found at 406, then a controller pose is determined at 408. This pose may be used as input to perform an action on the HMD (or other suitable computing device receiving inputs via the handheld controller). On the other hand, if no solution is found, then the process ends with no pose determined, at 410. The process may be repeated for future image data frames where no solution is found in a current image data frame.

A determined pose identified via a deep search may be used to constrain a later search, and thus help determine the updated pose more efficiently than via deep search. Continuing with FIG. 4, if it is determined that a prior pose does exist at 402, then a predictive search may be performed at 412 utilizing the previously determined pose. The predictive search utilizes the previous pose solution in combination with motion data (e.g. IMU data) from the handheld object to constrain a search for an updated pose. If a solution is found after predictive search at 414, then an updated pose is output at 408.

On the other hand, if no solution is found after the predictive search, then method 400 may comprise performing a translational search at 416. The translational search utilizes the previously determined pose from deep search, and assumes that the handheld object has moved a set amount of distance in an x- and/or y-direction with respect to the camera, with little rotation or movement in the z-direction. Therefore, the updated pose of the handheld object may be based on translationally shifting the prior pose. Performing predictive search and/or translational search when prior pose data exists may help to avoid unnecessarily performing a deep search, thereby saving computational power. If a solution is found using translational search at 418, an updated controller pose is output to 408. If neither predictive search nor translational search results in a pose solution, then method 400 performs a new deep search.

FIG. 5 shows a more detailed example method 500 of determining a pose of a handheld object having a plurality of light sources. Method 500 may be performed by any suitable computing system, such as an HMD utilizing processing system 300. Method 500 includes, at 502, acquiring image data of a surrounding environment, and at 504, detecting a subset of light sources of the plurality of light sources on the handheld object in the image data. Not all identified light sources in a captured image frame may correspond to a light source on the handheld object, and likewise not all light sources on the handheld object may be visible in any one image frame. In some examples, clusters of light sources with fewer than a threshold number of light sources, and/or light sources that are identified as outliers (e.g. light sources belonging to an object other than the handheld object of interest), may be excluded at this stage to help reduce the computational burden of the search, as indicated at 506. Further, other suitable criteria may be applied to exclude certain light sources.

Once a suitable cluster of light sources that likely arises from the handheld object has been located in the image data, method 500 includes performing a search for candidate poses. An example search process is described with reference to processes 508 to 548. Where no previous pose data is used, the search may be referred to as a deep search. Where previous pose data is available, a more constrained search (e.g. a predictive search or translational search) may be performed.

Performing the search includes, at 508, determining a plurality of sets of 2D-3D point correspondences between the subset of light sources in the image data and light sources of the handheld object. For example, each 2D u,v pixel in an image frame may be mapped to a corresponding candidate 3D x,y,z point based on a 3D reference model of the handheld object. The term "2D-3D point correspondence" is used herein to refer to a mapping between a 2D point in the image and a corresponding 3D point in the reference model, and thus includes the pair of both 2D and 3D points. Various pruning methods may be utilized throughout the search process that may help make the search process more computationally efficient. For example, determining the plurality of sets of 2D-3D point correspondences may include, at 510, locating a cluster of a least three light sources within the image data. Pre-filtering the detected light sources for light sources that are clustered together may help to more easily determine 2D-3D point correspondences compared to detected light sources that are sparsely scattered in the image, as light sources that are clustered together on the handheld object in 3D space are more likely to also cluster together in the image. For the purposes of example method

500, clusters of at least three light sources may help to determine a pose of the handheld object with a desired confidence level, but the detected light sources may be pre-filtered to locate a cluster of any suitable threshold number of light sources. For example, with three non-colinear light sources, up to four solutions may be obtained, of which one can be selected based on prior pose data. In other examples, clusters of four, five, or even greater numbers of light sources may be used.

Locating a cluster may allow a k-nearest neighbors algorithm to be used to determine sets of correspondence points. In such a method, first an anchor point is identified (e.g. as a centrally located light point), then a 2D-3D point correspondence is determined for the anchor point, and then k−1 additional neighboring points may be incrementally identified and 2D-3D point correspondences determined (e.g. k=5 for a cluster of five light sources). As such, method 500 includes, at 512, selecting one of the light sources in the cluster of a least four light sources to be an anchor point, and at 514, determining a 2D-3D point correspondence for the anchor point in the 3D model of the handheld object. Next, at 516, method 500 comprises determining a second 2D-3D point correspondence for a second light source in the cluster, the second light source being identified based on a proximity of the second light source to the anchor point, and at 518, determining a third 2D-3D point correspondence for a third light source in the cluster, the third light source being identified based on a proximity of the third light source to the anchor point. As more than one potential 2D-3D point correspondence may be determined for a same 2D image point, more than one set of 2D-3D point correspondences may be determined for a subset of light sources. Thus, processes 510 to 518 are repeated to identify a plurality of sets of 2D-3D point correspondences for the subset of light sources detected in the image data.

Next, method 500 includes, at 520, filtering the plurality of sets of 2D-3D point correspondences based upon geometric properties of each set of 2D-3D point correspondences, to form a filtered plurality of sets of 2D-3D point correspondences. For example, for a set of 2D-3D point correspondences, all permutations of groups of three in the set may be analyzed using filtering or pruning methods to determine whether to accept or reject the set of 2D-3D point correspondences. This may be performed for different sets of 2D-3D point correspondences of an identified cluster of light points, to help eliminate one or more sets of correspondence points at an early stage of the search. For example, for each of one or more sets of 2D-3D point correspondences, a triangle formed by three of the 2D-3D point correspondences in the image data may be determined, at 522, such as by reprojecting the 3D points on the model into the 2D image space. Geometric properties of the triangle may then be analyzed to determine whether or not to reject the set of 2D-3D point correspondences, such as based on a shape and/or an orientation of the triangle, as shown at 524. As one example, a back-face culling filtering process may be utilized, where it may be determined if the triangle is in an orientation that is "mismatched" with the real observed light sources in the image, e.g. facing a wrong direction, has points in the triangle that are not expected to be visible in the image, etc. As another example, a collinearity filtering process may be utilized, where if the three points of the triangle are substantially colinear in the image space, the 2D-3D point correspondences are rejected, as the collinearity may indicate that further analysis may not be sufficiently robust to help determine a pose. As a more specific example, a triangle may be rejected based on collinearity based on a degree of "flatness" of the triangle, such as where the degrees in one angle in the triangle are below or above a degree threshold, or where a total area of the triangle is below a threshold area. Any other suitable filtering techniques may be utilized to filter a set of 2D-3D point correspondences.

Method 500 further includes, at 526, determining one or more candidate poses from the filtered plurality of sets of 2D-3D point correspondences via a PnP process, as mentioned above. A PnP process may estimate the pose of a camera given a set of n 3D points in the world and their corresponding 2D projections in the image. In this context, the handheld object pose relative to the HMD pose (and therefore the HMD camera) may be determined using a rigid body transform of the HMD about the handheld object via the PnP process. In one example, a P3P solution may be determined, where n=3. In some examples, the PnP process may be used in combination with a RANSAC method, exhaustive search method, and/or other suitable method to hypothesize associations between the image observations and the points in the 3D model. Gravitational and motion information derived from IMUs of the HMD and handheld object may also be used to help reduce the complexity of data associations in the PnP process.

Figure 5B:
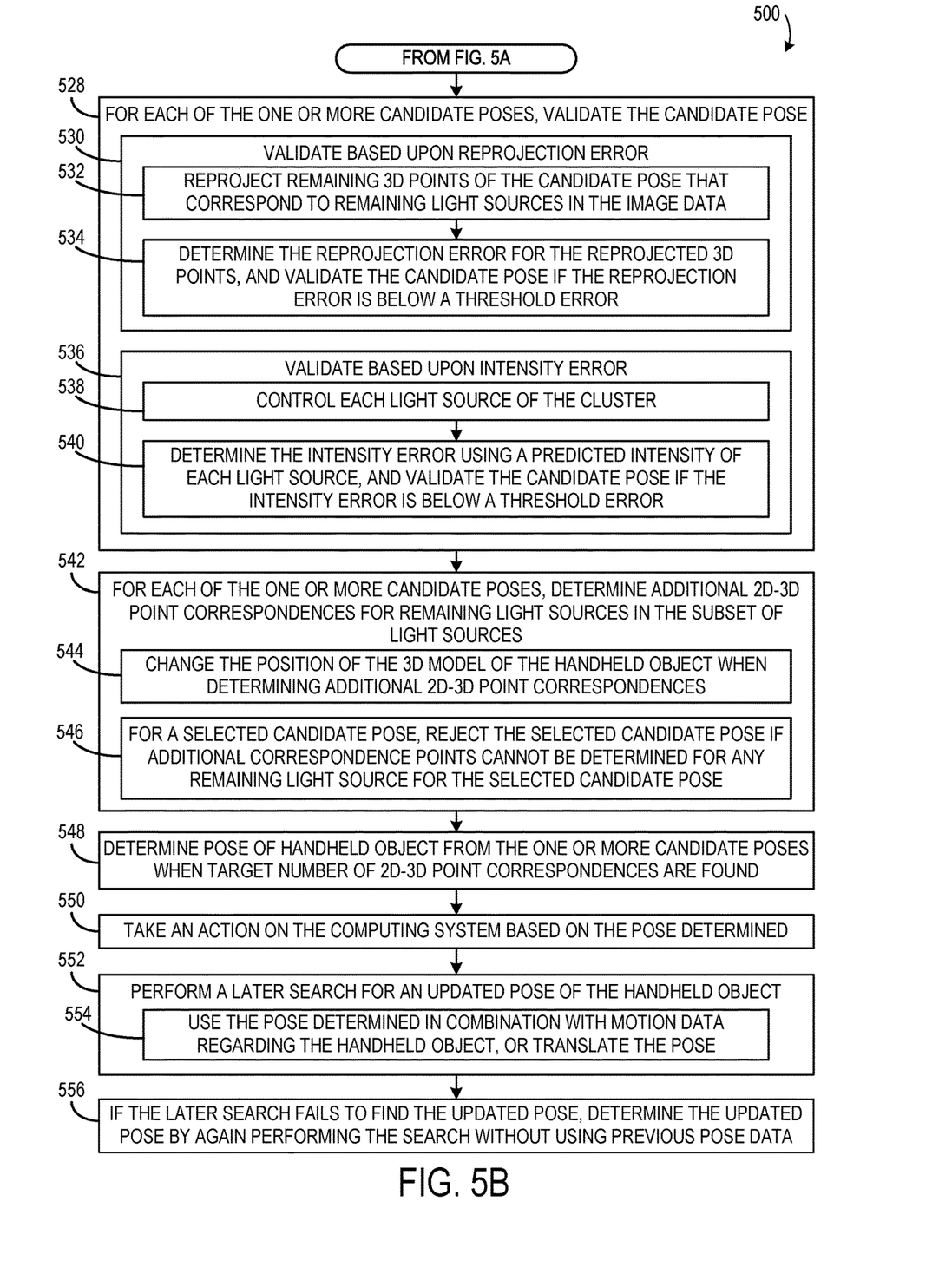

Continuing with FIG. 5B, performing the search includes, at 528, for each of the one or more candidate poses resulting from the PnP process, validating the candidate pose. As mentioned above, in some examples validation may be performed using a cost function to evaluate the hypothesized candidate poses and determine which are the most likely. In one example, validation may be performed based upon reprojection error, at 530, which is the distance between a detected 2D image point and its corresponding 3D point from the model reprojected back into image space based on the candidate pose. Accordingly, validation 530 includes reprojecting remaining 3D points of the candidate pose that correspond to remaining light sources in the image data, at 532, determining the reprojection error for the reprojected 3D points, and validating the candidate pose of the projection error is below a threshold error, at 534.

Figure 6:
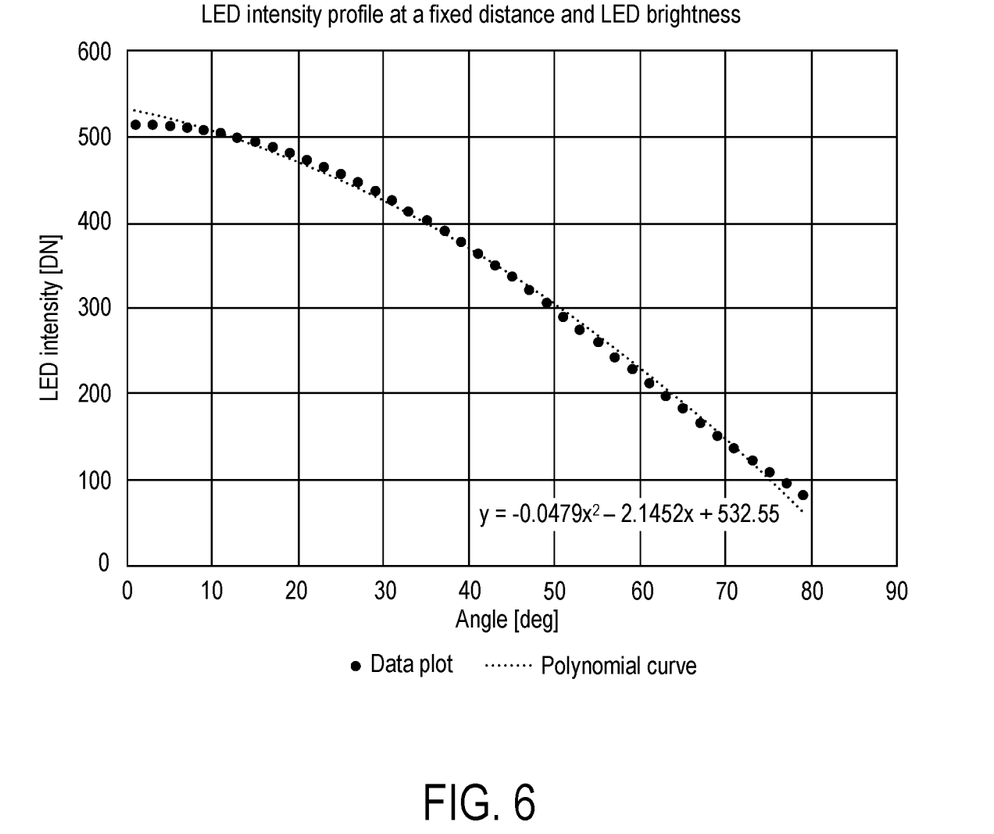
FIG. 6 is a graph illustrating LED intensity as a function of angle at a fixed distance for an example LED.

As another example, validation may be performed based upon intensity error, at 536. Intensity error relies on the fact that the intensity of a particular light source depends on the angle at which the light source is imaged, the distance between the light source and the camera, and the light source brightness (for some known camera parameters). FIG. 6 shows a graph illustrating example LED intensity profiles (one as plotted data points, one as a fitted polynomial curve) of LED intensity (DN) as a function of angle of the LED with respect to the camera at a fixed distance between the camera and the LED. The graph of FIG. 6 shows that LED intensity decreases as the angle of the LED increases with respect to the camera. Thus, if a detected intensity of one or more light sources is not within a predetermined range or threshold an expected intensity based on a candidate pose and the above parameters, the candidate pose may be rejected. Accordingly, continuing with method 500, validation 536 may further include controlling each light source of the cluster of at least three light sources, at 538, determining the intensity error using a predicted intensity of each light source, and validating the candidate pose if the intensity error is below a threshold error, at 540.

Figure 7:
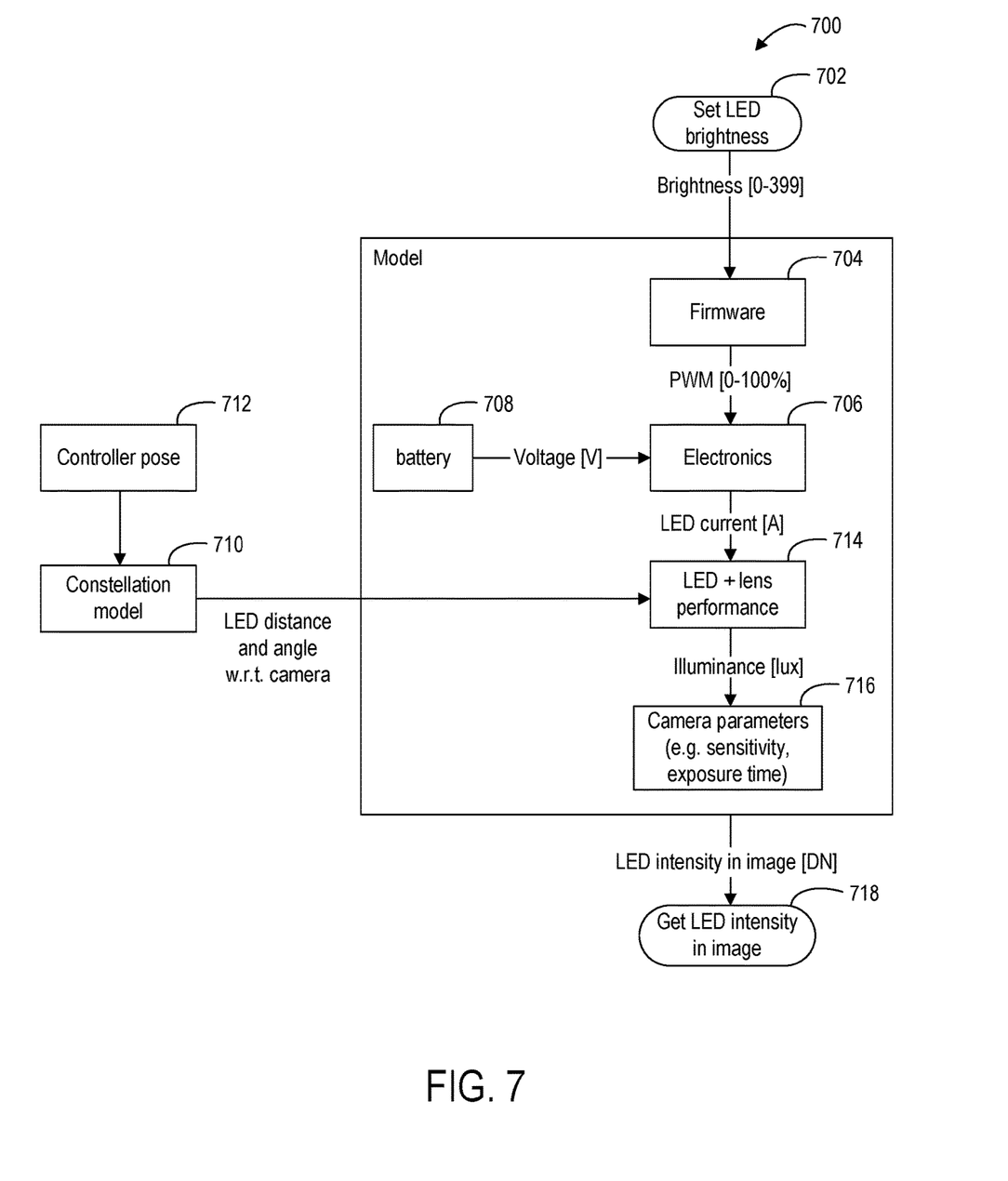
FIG. 7 shows a flow diagram illustrating an example method of determining an expected light source intensity based on a candidate pose of a handheld object.

FIG. 7 shows an example method 600 of determining the expected intensity for a light source (e.g. LED) on a handheld object based on an LED brightness model for a candidate pose based upon a relative position of the light source to the camera imaging the light source. In FIG. 7, each of the boxes represents a modeling of the similar physical component of the handheld device and imaging system. At 702, the LED brightness is set by the computing system (e.g. the HMD, handheld object, and/or host computing device as mentioned above). The LED brightness is input into a firmware modeling component 704 that models the firmware for controlling the LED brightness in the physical system, and the firmware modeling component 704 outputs a corresponding pulse width modulation (PWM) value for that LED. The PWM value is provided to a modeling of the LED electronics 706, which also receives an input of a voltage value from a battery modeling component 708. The input of voltage value may be based on the battery charge level of the handheld object. Based upon the voltage value, the PWM value, and the electronics modeled in the electronics modeling component 706, a modeled LED current is determined. The modeled LED current is then provided, along with data representing an LED distance and angle with respect to the camera as determined from a 3D constellation model 710 for the handheld object for a candidate controller pose 712, to an illuminance modeling component that outputs an expected illuminance at the camera position based upon the LED and LED lens performance characteristics 714. The expected illuminance is further processed via a camera parameter modeling component 716 that models the camera response (e.g. image sensor sensitivity, exposure time) to the modeled illuminance. The model outputs an expected LED intensity in the image data at 718, as expressed in the following equation.

$$I_{LED} = \frac{(k_2\alpha^2 + k_1\alpha + k_0)t_{exp}}{d^2} b_{LED}$$

$I_{LED}$ is the intensity in the image in digital numbers (DN), d is the LED distance to the camera in meters, a is the LED viewing angle in radians, $t_{exp}$ is the camera exposure time in seconds, and $b_{LED}$ is the LED brightness. The k values may be estimated during a training phase using, for example, regression analysis against example captured data. It will be understood that the model of FIG. 7 is an example of a model for determining expected LED intensity, and that any other suitable models (e.g. a trained machine learning model) or computations may be utilized.

Figure 8:
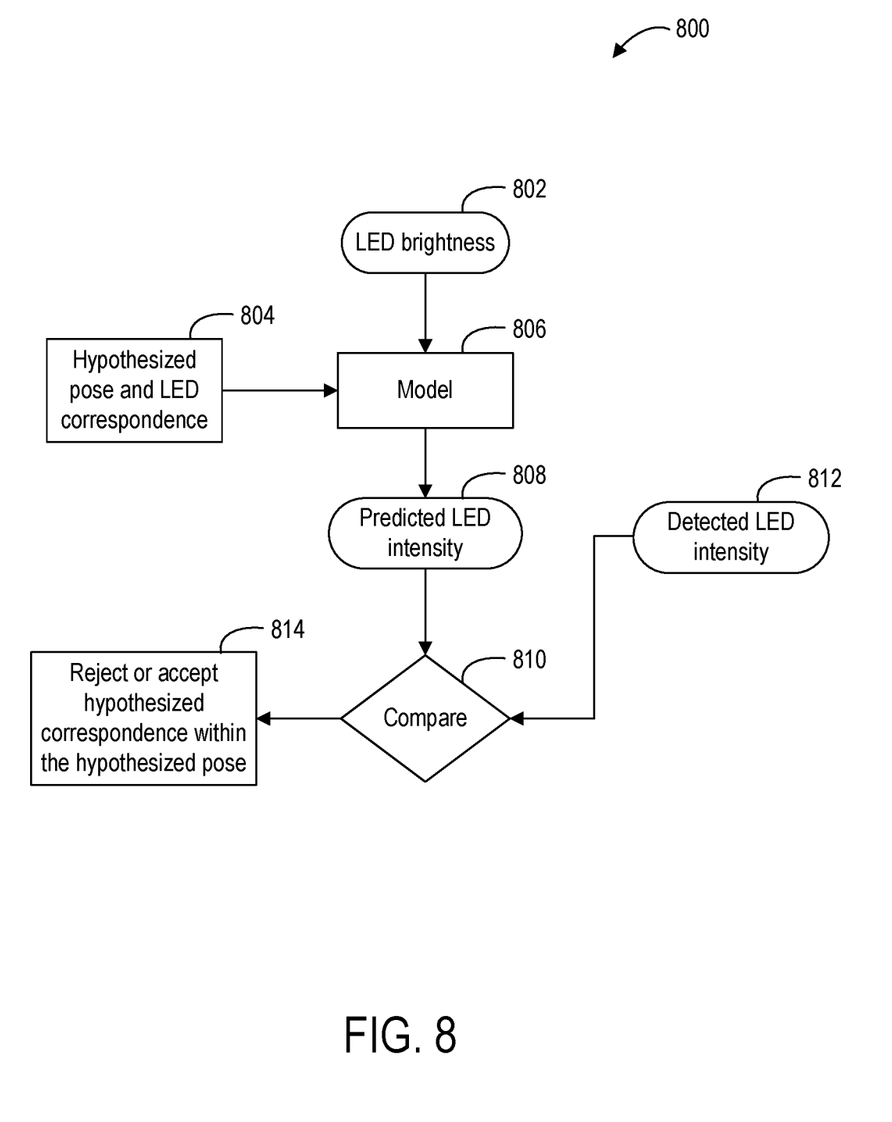
FIG. 8 shows a flow diagram illustrating an example method of light intensity thresholding.

FIG. 8 shows an example method 800 of performing intensity thresholding to determine whether to accept or reject a candidate pose based on comparing the detected LED intensity to the predicted LED intensity, e.g. as determined via FIG. 7. LED brightness 802 and hypothesized pose and LED correspondences 804 are both received as inputs into an LED intensity model 806, such as the model of FIG. 7. The model outputs a predicted LED intensity at 808, which is compared at 810 to a detected LED intensity 812, e.g. to determine the intensity error. Based on this comparison, the method at 814 includes either rejecting or accepting the hypothesized correspondence within the hypothesized pose, e.g. if the intensity error exceeds a threshold error.

Returning to FIG. 5, the search further includes, at 542, for each of the one or more candidate poses, determining additional 2D-3D point correspondences for remaining light sources in the subset of light sources, which may help to optimize or better fit a candidate pose to the observed data. As one example, 2D-3D point correspondences may be determined for a fourth light source, a fifth light source, and a sixth light source. When determining one or more of the additional 2D-3D point correspondences, a position of the 3D model being used to build the 2D-3D point correspondences may be allowed to move rotationally and/or translationally at 544. Allowing the model to move while determining one or more additional correspondence points may help to optimize the determined pose by matching the pose more closely to the observed light pattern.

In some examples, a candidate pose is rejected if additional correspondence points cannot be determined for any remaining light source, at 546. For example, if, after validating three 2D-3D point correspondences for a candidate pose, a fourth 2D-3D point correspondence cannot be found for a fourth light source, the selected candidate pose may be automatically rejected.

The search ends upon determining a pose of the handheld object from the one or more candidate poses, at 548. In some examples, the final pose may be determined after reaching a target number of 2D-3D point correspondences. In one example, a particular candidate pose may be used as a "final" pose solution after fitting 2D-3D point correspondences for six light sources total. In other examples, any other suitable target number of 2D-3D point correspondences may be required before returning a final pose solution. For example, more than six 2D-3D point correspondences may be determined if a time budget allows.

Method 500 further includes, at 550, taking an action on the computing system based on the pose determined. For example, the pose of the handheld object may be used as a user input to the HMD, in response to which the HMD may display a user interface response, launch/close an application, or take any other suitable action. Method 500 further includes, at 552, performing a later search for an updated pose of the handheld object. As described above, previous pose estimates may be used to help constrain subsequent pose determinations, which may help to determine an updated pose more efficiently. Thus, method 500 may comprise, at 554, using the prior pose in combination with motion data regarding the handheld object to determine an updated pose (as in the above-described predictive search), and/or translating the prior pose to determine an updated pose (as in the above-described translational search). If the later search fails to find the updated pose, then an updated pose may be determined by again performing the search without using previous pose data, at 556.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
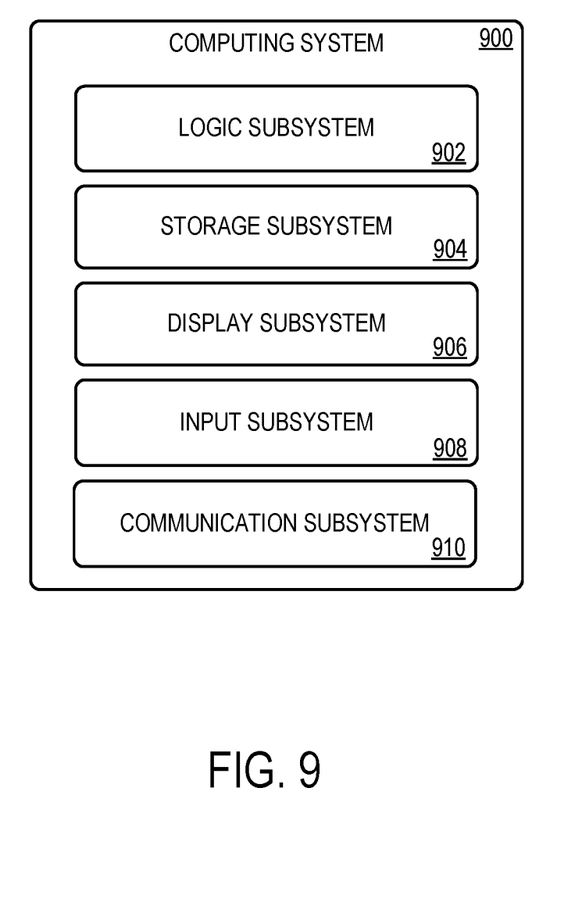
FIG. 9 is a block diagram showing an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic subsystem 902 and a storage subsystem 904. Computing system 900 may optionally include a display subsystem 906, input subsystem 908, communication subsystem 910, and/or other components not shown in FIG. 9.

Logic subsystem 902 includes one or more physical devices configured to execute instructions. For example, the logic subsystem 902 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 902 may include one or more processors configured to execute software instructions. Additionally or alternatively, the logic subsystem 902 may include one or more hardware or firmware logic machines configured to execute hardware or firmware instructions. Processors of the logic subsystem 902 may be single-core or multi-core, and the instructions executed thereon may be configured for sequential, parallel, and/or distributed processing. Individual components of the logic subsystem 902 optionally may be distributed among two or more separate devices, which may be remotely located and/or configured for coordinated processing. Aspects of the logic subsystem 902 may be virtualized and executed by remotely accessible, networked computing devices configured in a cloud-computing configuration.

Storage subsystem 904 includes one or more physical devices configured to hold instructions executable by the logic machine to implement the methods and processes described herein. When such methods and processes are implemented, the state of storage subsystem 904 may be transformed—e.g., to hold different data.

Storage subsystem 904 may include removable and/or built-in devices. Storage subsystem 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 904 may include volatile, nonvolatile, dynamic, static, read/write, read-only, random-access, sequential-access, location-addressable, file-addressable, and/or content-addressable devices.

It will be appreciated that storage subsystem 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 902 and storage subsystem 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 906 may be used to present a visual representation of data held by storage subsystem 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic subsystem 902 and/or storage subsystem 904 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

Another example provides a computing system, comprising a logic subsystem, and a storage subsystem comprising instructions executable by the logic subsystem to determine a pose of a handheld object comprising a plurality of light sources by acquiring image data of a surrounding environment, detecting a subset of light sources of the plurality of light sources of the handheld object in the image data, performing a search, without using previous pose data, to determine the pose of the handheld object relative to the computing system by determining a plurality of sets of 2D-3D point correspondences between the subset of light sources in the image data and light sources of the handheld object based upon comparing a 3D model of the handheld object to the image data, filtering the plurality of sets of 2D-3D point correspondences based upon geometric properties of each set of 2D-3D point correspondences to form a filtered plurality of sets of 2D-3D point correspondences, determining one or more candidate poses from the filtered plurality of sets of 2D-3D point correspondences via a perspective-n-point process, and determining the pose of the handheld object from the one or more candidate poses, taking an action on the computing system based on the pose determined, using the pose determined to perform a later search for an updated pose of the handheld object, and if the later search fails to find the updated pose, determining the updated pose by again performing the search without using previous pose data. The instructions may be alternatively or additionally executable to determine each set of 2D-3D point correspondences by locating a cluster of at least four light sources within the image data, selecting a selected light source in the cluster to be an anchor point, determining a 2D-3D point correspondence for the anchor point in the 3D model of the handheld object, determining a second 2D-3D point correspondence for a second light source in the cluster of at least four light sources based upon a proximity of the second light source to the anchor point, and determining a third 2D-3D point correspondence for a third light source in the cluster of at least four light sources based upon a proximity of the third light source to the anchor point. The instructions may be alternatively or additionally executable to filter the plurality of sets of 2D-3D point correspondences by, for one or more sets of 2D-3D point correspondences, determining a triangle formed by three 2D-3D point correspondences in the image data, and rejecting the set of 2D-3D point correspondences based on one or more of a shape of the triangle and an orientation of the triangle. The instructions may be alternatively or additionally executable to for each of the one or more candidate poses, determine additional 2D-3D point correspondences for each remaining light source in the cluster of at least four light sources based on the 3D model of the handheld object. The instructions may be alternatively or additionally executable to, for each of the one or more candidate poses, validate the candidate pose based upon a reprojection error by reprojecting remaining 3D points of the candidate pose that correspond to remaining light sources in the image data, determining the reprojection error for the reprojected 3D points, and validating the candidate pose if the reprojection error is below a threshold error. The instructions may be alternatively or additionally executable to, for each of the one or more candidate poses, validate the candidate pose based upon an intensity error by controlling each light source of the cluster of at least four light sources on the handheld object, determining the intensity error using a predicted intensity of each light source based upon the candidate pose compared to a detected intensity for each light source, and validating the candidate pose if the intensity error is below a threshold error. The instructions may be alternatively or additionally executable to, for a selected candidate pose, reject the selected candidate pose if additional 2D-3D point correspondences cannot be determined for any remaining light source for the selected candidate pose. The instructions may be alternatively or additionally executable to change the position of the 3D model of the handheld object when determining one or more of the additional 2D-3D point correspondences. The instructions may be alternatively or additionally executable to use the pose determined to perform the later search for the updated pose of the handheld object by using the pose determined in combination with motion data regarding the handheld object. The instructions may be alternatively or additionally executable to use the pose determined to perform the later search for the updated pose of the handheld object by translating the pose determined. The pose determined may additionally or alternatively include a candidate pose for which a target number of 2D-3D point correspondences are determined.

Another example provides a computing system, comprising a logic subsystem, and a storage subsystem configured to store instructions executable by the logic subsystem to determine a pose of a handheld object comprising a plurality of light sources by acquiring image data of a surrounding environment, detecting, in the image data, a subset of light sources of the plurality of light sources of the handheld object, pre-filtering the detected plurality of light sources in the image data for a cluster of a threshold number of light sources, determining a plurality of sets of 2D-3D point correspondences between the subset of light sources in the image data and light sources of the handheld object based upon comparing a 3D model of the handheld object to the image data, filtering the plurality of sets of 2D-3D point correspondences based upon geometric properties of each set of 2D-3D point correspondences to form a filtered plurality of sets of 2D-3D point correspondences, determining one or more candidate poses from the filtered plurality of sets of 2D-3D point correspondences via a perspective-n-point process, for each of the one or more candidate poses, determining additional 2D-3D point correspondences for remaining light sources in the subset of light sources, determining the pose of the handheld object from the one or more candidate poses, and taking an action on the computing system based on the pose determined. The instructions may be alternatively or additionally executable to filter the plurality of sets of 2D-3D point correspondences by, for one or more sets of 2D-3D point correspondences, determining a triangle formed by three 2D-3D point correspondences in the image data, and rejecting the set of 2D-3D point correspondences based on one or more of a shape of the triangle and an orientation of the triangle. The instructions may be alternatively or additionally executable to, for each of the one or more candidate poses, validate the candidate pose based upon a reprojection error by reprojecting remaining 3D points of the candidate pose that correspond to remaining light sources in the image data, determining the reprojection error for the reprojected 3D points, and validating the candidate pose if the reprojection error is below a threshold error. The instructions may be alternatively or additionally executable to, for each of the one or more candidate poses, validate the candidate pose based upon an intensity error by controlling each light source of the cluster of at least four light sources on the handheld object, determining the intensity error using a predicted intensity of each light source based upon the candidate pose compared to a detected intensity for each light source, and validating the candidate pose if the intensity error is below a threshold error. The instructions may be alternatively or additionally executable to, for a selected candidate pose, reject the selected candidate pose if additional 2D-3D point correspondences cannot be determined for any remaining light source for the selected candidate pose.

Another example provides, on a computing system, a method of determining a pose of a handheld object comprising a plurality of light sources, the method comprising acquiring image data of a surrounding environment, detecting a subset of light sources of the plurality of light sources of the handheld object in the image data, performing a search, without using previous pose data, to determine the pose of the handheld object relative to the computing system by determining a plurality of sets of 2D-3D point correspondences between the subset of light sources in the image data and light sources of the handheld object based upon comparing a 3D model of the handheld object to the image data, filtering the plurality of sets of 2D-3D point correspondences based upon geometric properties of each set of 2D-3D point correspondences to form a filtered plurality of sets of 2D-3D point correspondences, determining one or more candidate poses from the filtered plurality of sets of 2D-3D point correspondences via a perspective-n-point process, and determining the pose of the handheld object from the one or more candidate poses, taking an action on the computing device based on the pose determined, using the pose determined to perform a later search for an updated pose of the handheld object, and if the later search fails to find the updated pose, determining the updated pose by again performing the search without using previous pose data. Filtering the plurality of sets of 2D-3D point correspondences may additionally or alternatively include, for one or more sets of 2D-3D point correspondences, determining a triangle formed by three 2D-3D point correspondences in the image data, and rejecting the set of 2D-3D point correspondences based on one or more of a shape of the triangle and an orientation of the triangle. The method may additionally or alternatively include, for each of the one or more candidate poses, validating the candidate pose based upon a reprojection error by reprojecting remaining 3D points of the candidate pose that correspond to remaining light sources in the image data, determining the reprojection error for the reprojected 3D points, and validating the candidate pose if the reprojection error is below a threshold error. The method may additionally or alternatively include, for each of the one or more candidate poses, validating the candidate pose based upon an intensity error by controlling each light source of the cluster of at least four light sources on the handheld object, determining the intensity error using a predicted intensity of each light source based upon the candidate pose compared to a detected intensity for each light source, and validating the candidate pose if the intensity error is below a threshold error.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising
a logic subsystem; and
a storage subsystem comprising instructions executable by the logic subsystem to determine a pose of a handheld object comprising a plurality of light sources by
  acquiring image data of a surrounding environment,
  detecting a subset of light sources of the plurality of light sources of the handheld object in the image data,
  performing a search, without using previous pose data, to determine the pose of the handheld object relative to the computing system by
    determining a plurality of sets of 2D-3D point correspondences between the subset of light sources in the image data and light sources of the handheld object based upon comparing a 3D model of the handheld object to the image data;
    filtering the plurality of sets of 2D-3D point correspondences based upon geometric properties of each set of 2D-3D point correspondences to form a filtered plurality of sets of 2D-3D point correspondences;
    determining one or more candidate poses from the filtered plurality of sets of 2D-3D point correspondences via a perspective-n-point process; and
    determining the pose of the handheld object from the one or more candidate poses;
  taking an action on the computing system based on the pose determined,
  using the pose determined to perform a later search for an updated pose of the handheld object, and
  if the later search fails to find the updated pose, determining the updated pose by again performing the search without using previous pose data.

2. The computing system of claim 1, wherein the instructions are executable to determine each set of 2D-3D point correspondences by
  locating a cluster of at least four light sources within the image data,
  selecting a selected light source in the cluster to be an anchor point,
  determining a 2D-3D point correspondence for the anchor point in the 3D model of the handheld object,
  determining a second 2D-3D point correspondence for a second light source in the cluster of at least four light sources based upon a proximity of the second light source to the anchor point, and
  determining a third 2D-3D point correspondence for a third light source in the cluster of at least four light sources based upon a proximity of the third light source to the anchor point.

3. The computing system of claim 1, wherein the instructions are executable to filter the plurality of sets of 2D-3D point correspondences by, for one or more sets of 2D-3D point correspondences, determining a triangle formed by three 2D-3D point correspondences in the image data, and rejecting the set of 2D-3D point correspondences based on one or more of a shape of the triangle and an orientation of the triangle.

4. The computing system of claim 1, wherein the instructions are further executable to, for each of the one or more candidate poses, determine additional 2D-3D point correspondences for each remaining light source in the cluster of at least four light sources based on the 3D model of the handheld object.

5. The computing system of claim 4, wherein the instructions are executable to, for each of the one or more candidate poses, validate the candidate pose based upon a reprojection error by reprojecting remaining 3D points of the candidate pose that correspond to remaining light sources in the image data, determining the reprojection error for the reprojected 3D points, and validating the candidate pose if the reprojection error is below a threshold error.

6. The computing system of claim 4, wherein the instructions are executable to, for each of the one or more candidate poses, validate the candidate pose based upon an intensity error by controlling each light source of the cluster of at least four light sources on the handheld object, determining the intensity error using a predicted intensity of each light source based upon the candidate pose compared to a detected intensity for each light source, and validating the candidate pose if the intensity error is below a threshold error.

7. The computing system of claim 4, wherein the instructions are executable to, for a selected candidate pose, reject the selected candidate pose if additional 2D-3D point correspondences cannot be determined for any remaining light source for the selected candidate pose.

8. The computing system of claim 4, wherein the instructions are further executable to change the position of the 3D model of the handheld object when determining one or more of the additional 2D-3D point correspondences.

9. The computing system of claim 1, wherein the instructions are further executable to use the pose determined to perform the later search for the updated pose of the handheld object by using the pose determined in combination with motion data regarding the handheld object.

10. The computing system of claim 1, wherein the instructions are further executable to use the pose determined to perform the later search for the updated pose of the handheld object by translating the pose determined.

11. The computing system of claim 1, wherein the pose determined comprises a candidate pose for which a target number of 2D-3D point correspondences are determined.

12. A computing system, comprising
a logic subsystem; and
a storage subsystem configured to store instructions executable by the logic subsystem to determine a pose of a handheld object comprising a plurality of light sources by
acquiring image data of a surrounding environment,
detecting, in the image data, a subset of light sources of the plurality of light sources of the handheld object,
pre-filtering the detected plurality of light sources in the image data for a cluster of a threshold number of light sources,
determining a plurality of sets of 2D-3D point correspondences between the subset of light sources in the image data and light sources of the handheld object based upon comparing a 3D model of the handheld object to the image data,
filtering the plurality of sets of 2D-3D point correspondences based upon geometric properties of each set of 2D-3D point correspondences to form a filtered plurality of sets of 2D-3D point correspondences,
determining one or more candidate poses from the filtered plurality of sets of 2D-3D point correspondences via a perspective-n-point process,
for each of the one or more candidate poses, determining additional 2D-3D point correspondences for remaining light sources in the subset of light sources,
determining the pose of the handheld object from the one or more candidate poses, and
taking an action on the computing system based on the pose determined.

13. The computing system of claim 12, wherein the instructions are executable to filter the plurality of sets of 2D-3D point correspondences by, for one or more sets of 2D-3D point correspondences, determining a triangle formed by three 2D-3D point correspondences in the image data, and rejecting the set of 2D-3D point correspondences based on one or more of a shape of the triangle and an orientation of the triangle.

14. The computing system of claim 12, wherein the instructions are executable to, for each of the one or more candidate poses, validate the candidate pose based upon a reprojection error by reprojecting remaining 3D points of the candidate pose that correspond to remaining light sources in the image data, determining the reprojection error for the reprojected 3D points, and validating the candidate pose if the reprojection error is below a threshold error.

15. The computing system of claim 12, wherein the instructions are executable to, for each of the one or more candidate poses, validate the candidate pose based upon an intensity error by controlling each light source of the cluster of at least four light sources on the handheld object, determining the intensity error using a predicted intensity of each light source based upon the candidate pose compared to a detected intensity for each light source, and validating the candidate pose if the intensity error is below a threshold error.

16. The computing system of claim 12, wherein the instructions are executable to, for a selected candidate pose, reject the selected candidate pose if additional 2D-3D point correspondences cannot be determined for any remaining light source for the selected candidate pose.

17. On a computing system, a method of determining a pose of a handheld object comprising a plurality of light sources, the method comprising:
acquiring image data of a surrounding environment;
detecting a subset of light sources of the plurality of light sources of the handheld object in the image data;
performing a search, without using previous pose data, to determine the pose of the handheld object relative to the computing system by
determining a plurality of sets of 2D-3D point correspondences between the subset of light sources in the image data and light sources of the handheld object based upon comparing a 3D model of the handheld object to the image data,
filtering the plurality of sets of 2D-3D point correspondences based upon geometric properties of each set of 2D-3D point correspondences to form a filtered plurality of sets of 2D-3D point correspondences,
determining one or more candidate poses from the filtered plurality of sets of 2D-3D point correspondences via a perspective-n-point process, and
determining the pose of the handheld object from the one or more candidate poses;
taking an action on the computing device based on the pose determined;
using the pose determined to perform a later search for an updated pose of the handheld object; and
if the later search fails to find the updated pose, determining the updated pose by again performing the search without using previous pose data.

18. The method of claim 17, wherein filtering the plurality of sets of 2D-3D point correspondences comprises, for one or more sets of 2D-3D point correspondences, determining a triangle formed by three 2D-3D point correspondences in the image data, and rejecting the set of 2D-3D point correspondences based on one or more of a shape of the triangle and an orientation of the triangle.

19. The method of claim 17, further comprising, for each of the one or more candidate poses, validating the candidate pose based upon a reprojection error by reprojecting remaining 3D points of the candidate pose that correspond to remaining light sources in the image data, determining the reprojection error for the reprojected 3D points, and validating the candidate pose if the reprojection error is below a threshold error.

20. The method of claim 17, further comprising, for each of the one or more candidate poses, validating the candidate pose based upon an intensity error by controlling each light source of the cluster of at least four light sources on the handheld object, determining the intensity error using a predicted intensity of each light source based upon the candidate pose compared to a detected intensity for each light source, and validating the candidate pose if the intensity error is below a threshold error.

* * * * *